US012213625B2

(12) United States Patent
Jung et al.

(10) Patent No.: US 12,213,625 B2
(45) Date of Patent: Feb. 4, 2025

(54) BLENDER

(71) Applicant: LG ELECTRONICS INC., Seoul (KR)

(72) Inventors: Sangjin Jung, Seoul (KR); Jinhae Ye, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 17/640,723

(22) PCT Filed: Sep. 11, 2020

(86) PCT No.: PCT/KR2020/012307
§ 371 (c)(1),
(2) Date: Mar. 4, 2022

(87) PCT Pub. No.: WO2021/054683
PCT Pub. Date: Mar. 25, 2021

(65) Prior Publication Data
US 2022/0322880 A1    Oct. 13, 2022

(30) Foreign Application Priority Data
Sep. 16, 2019    (KR) .......................... 10-2019-0113770

(51) Int. Cl.
*A47J 43/046*    (2006.01)
*A47J 43/07*    (2006.01)
(Continued)

(52) U.S. Cl.
CPC ............. *A47J 43/07* (2013.01); *A47J 43/046* (2013.01); *B01F 33/83612* (2022.01);
(Continued)

(58) Field of Classification Search
CPC ........ A47J 43/046; A47J 43/07; A47J 36/321; B01F 35/2205
See application file for complete search history.

(56) References Cited

U.S. PATENT DOCUMENTS

| 10,328,402 B2 | 6/2019 | Kolar et al. | |
| 2014/0269154 A1* | 9/2014 | Kolar | A47J 43/085 366/241 |

(Continued)

FOREIGN PATENT DOCUMENTS

| CN | 100455241 C | 1/2009 |
| CN | 109008624 A | 12/2018 |

(Continued)

*Primary Examiner* — Jared O Brown
(74) *Attorney, Agent, or Firm* — Bryan Cave Leighton Paisner LLP

(57) ABSTRACT

A blender includes a body formed by an outer case made of a metal material to define an outer appearance and an inner case accommodated inside the outer case; a container which is seated on the body in which a blade module for crushing food is disposed; a motor assembly provided inside the inner case to rotate the blade module; and a wireless communication module provided in the inner case and performing wireless communication with a remote device. The outer case includes a communication module opening that is opened at a position corresponding to a mounting position of the communication module.

14 Claims, 14 Drawing Sheets

(51) Int. Cl.
    *B01F 33/80*            (2022.01)
    *B01F 35/22*            (2022.01)
    *B01F 101/00*          (2022.01)

(52) U.S. Cl.
    CPC ....... *B01F 35/2205* (2022.01); *A47J 43/0766* (2013.01); *A47J 43/0777* (2013.01); *B01F 2101/1805* (2022.01)

(56) References Cited

U.S. PATENT DOCUMENTS

| | | | |
|---|---|---|---|
| 2016/0256839 A1* | 9/2016 | Dickson, Jr. | A47J 43/0727 |
| 2020/0359843 A1* | 11/2020 | Ye | A47J 43/0766 |
| 2020/0397190 A1* | 12/2020 | Luo | A47J 43/085 |

FOREIGN PATENT DOCUMENTS

| | | | |
|---|---|---|---|
| CN | 208658816 U | | 3/2019 |
| CN | 208709432 U | * | 4/2019 |
| CN | 106798487 B | | 6/2019 |
| JP | 2002-064320 A | | 2/2002 |
| KR | 10-1797875 B1 | | 11/2017 |
| KR | 10-2018-0054323 A | | 5/2018 |
| WO | 2018104743 A2 | | 6/2018 |

* cited by examiner

BLENDER

CROSS-REFERENCE TO RELATED APPLICATIONS

This application is a National Stage filing under 35 U.S.C. 371 of International Application No. PCT/KR2020/012307, with an international filing date of Sep. 11, 2020, which claims the benefit of KR Patent Application No. 10-2019-0113770, filed on Sep. 16, 2019, all of which are incorporated by reference in their entirety herein.

TECHNICAL FIELD

The present disclosure relates to a blender.

BACKGROUND

In general, a blender is a home appliance that cuts food contained in a container by a blade rotated by an electric motor, crushes food into powder, or makes food into a liquid-like state, and is also commonly referred to as a blender.

In a general blender, a container is seated on a top surface of the body in which a motor is embedded, and when the container is seated, a blade inside the container is connected to a rotation shaft of the motor to be in a rotatable state. In addition, the user may drive the motor by manipulating the body after putting the food in the container, and the blade may rotate by the driving of the motor to crush the food.

Such a blender has recently been developed as a large-capacity blender with a large container, and also, a blender using a motor rotating at a high speed to more effectively crush various foods is being developed.

In addition, the blender may be operated for crushing various foods, and a blender capable crushing various foods through a simple operation is being developed.

Korean Patent Laid-Open Publication No. 10-2018-0054323 discloses a blender control device that receives information for operation of a blender through a wireless communication unit connected to a controller and causes the blender to perform an appropriate operation.

In addition, Korean Patent Registration No. 10-1797875 discloses a mixer that calculates data for the operation of the mixer by measuring weight and sugar content, and shares the calculated data with a plurality of mixers through a communication unit to control the operation.

However, in the related art, the arrangement structure of the components for communication is not specifically disclosed. Thus, a difference in communication performance may occur according to the arrangement of the components for communication.

Particularly, when an outer body of a blender in which components for communication are disposed is made of a metal material, this may restrict the transmission of communication signals, and normal and smooth operation may not be guaranteed.

DISCLOSURE

Technical Problem

An embodiment of the present disclosure aims to provide a blender in which wireless communication performance of a blender having a metallic appearance is ensured.

An embodiment of the present disclosure aims to provide a blender that prevents deterioration in appearance while ensuring wireless communication performance.

An embodiment of the present disclosure aims to provide a blender that facilitates mounting and service of a wireless communication module.

Technical Solution

A blender according to an embodiment of the present disclosure includes: a body formed by an outer case made of a metal material to define an outer appearance and an inner case accommodated inside the outer case; a container which is seated on the body in which a blade module for crushing food is disposed; a motor assembly provided inside the inner case to rotate the blade module; and a wireless communication module provided in the inner case and performing wireless communication with a remote device, wherein the outer case comprises a communication module opening that is opened at a position corresponding to a mounting position of the communication module.

The outer case and the inner case may be formed in a box shape with an open lower surface, and the open lower surface may be covered by a bottom cover defining a bottom surface of the blender.

A lower end of the outer case may be bent inward, the inner case may enter and exit through the open lower surface of the outer case, and a circumferential surface of the inner case may be spaced apart from a circumferential surface of the outer case.

The communication module may be inserted through the open lower surface of the inner case, and may be mounted on an inner surface of the inner case.

A circumferential surface of the inner case may be spaced apart from a circumferential surface of the outer case, a case recessed portion may be defined on one side of a circumferential surface of the outer case so as to be in contact with an outer surface of the inner case, and the communication module opening may be defined inside the case recessed portion.

A rear plate covering the case recessed portion may be mounted on the case recessed portion, and the rear plate may be made of a material different from that of the outer case.

A rear plate having a thickness corresponding to a depth of the case recessed portion may be mounted on the case recessed portion, and in a state in which the rear plate is mounted, outer surfaces of the rear plate and the outer case may form a same plane.

A rear plate may be mounted on the case recessed portion, a plate coupling portion protruding in a hook shape may be defined around the rear plate, and a plate coupling hole into which the plate coupling protrusion may be inserted is defined in the case recessed portion.

The inner case may further include a plate restriction hole defined at a position corresponding to the plate coupling hole, and the plate coupling protrusion may sequentially pass through the plate coupling hole and the plate restriction hole to be restricted to the inner case.

The communication module opening may be defined in a size that overlaps at least a portion of the communication module.

The communication module may include: a communication PCB; and a PCB case in which the communication PCB is accommodated and which is fixed and mounted to the inner case.

The inner surface of the inner case may be provided with a module support rib protruding to support the PCB case.

A pair of the module support ribs may extend in a vertical direction while being spaced apart from each other, and the PCB case may include a case rib inserted between the pair of the module support ribs spaced apart from each other.

The inner case may include a case restriction rib protruding to be spaced apart from the module support rib, and the PCB case may be inserted and fixed between the module support rib and the case restriction rib.

A screw coupling portion which protrudes in a direction crossing an inserting direction of the communication module and through which a screw passes may be defined in the PCB case, and a case fixing boss which protrudes to be supported by the screw coupling portion and to which the screw is coupled may be defined in the inner case.

The inner case may be provided with a seating portion protruding upward to seat the container, and the container seating portion may protrude to the outside of the outer case through the opening of the top surface of the outer case.

A plurality of plate restriction holes may be defined, and at least one of the plurality of plate restriction holes may be defined in an area in which the communication module is disposed.

The module support rib may protrude laterally to provide a stepped surface, and a rib support portion for supporting the end of the PCB case may be defined.

In another aspect, an embodiment of the present disclosure may include: a body; a container which is seated on the body and in which a blade module for crushing food is disposed; a motor assembly provided in the body and connected to the blade module; and a wireless communication module provided in the body and performing wireless communication with a remote device, wherein a communication module opening that is opened at one side corresponding to the communication module is defined in the body.

Advantageous Effects

The blender according to the embodiment of the present disclosure may have the following effects.

In the blender according to an embodiment of the present disclosure, the communication module is mounted inside the inner case, and the outer case made of a metal material is provided on the outside of the inner case to form a luxurious and robust appearance.

In addition, the communication module opening is defined in the outer case corresponding to the position of the communication module, so that the communication module may smoothly perform wireless communication with a remote device. That is, the communication module is not covered by the outer case made of metal. Thus, communication signals may easily pass through the blender body, and the wireless communication performance of the communication module may be ensured.

In addition, the case recessed portion is defined in the outer case, and the communication module opening is defined in the case recessed portion. In addition, the case recessed portion may be covered by the rear plate made of a different material such as plastic. The rear plate may be made of a material that facilitates transmission of a wireless communication signal. Thus, the communication module opening is covered so that the communication module opening is not exposed to the outside, and wireless communication of the communication module may be effectively performed.

In addition, the rear plate covers the case recessed portion, and the same outer surface as the outer case is defined so that the shape of the outer appearance may be maintained.

In addition, the communication module may be provided with the communication PCB and the PCB case accommodating the communication PCB. In addition, the module support rib mounting the communication module is defined in the inner case. The PCB case is provided with the case rib guiding the mounting of the communication module. This enables the communication module to be mounted accurately inside the inner case.

In addition, the module support rib is provided with the rib support, and the case restriction rib and the case fixing boss are further formed in the inner case. This enables the communication module to be easily fixed and mounted to the inner case.

That is, the PCB case of the communication module is fixed and mounted through the open lower surface of the inner case, and the communication module may be maintained in a fixedly mounted state at a position corresponding to the communication module opening.

DETAILED DESCRIPTION

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

Figure 1:
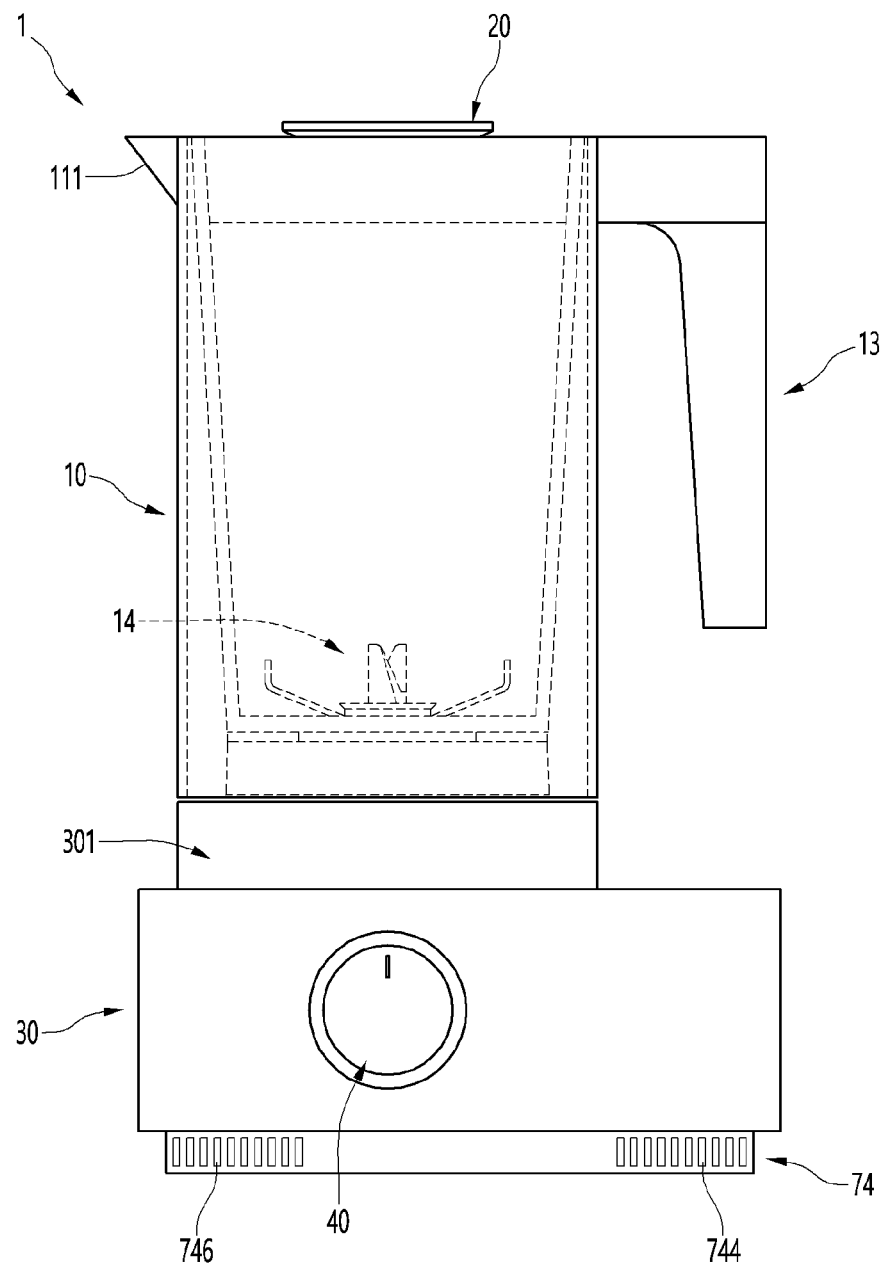
FIG. 1 is a front view of a blender according to an embodiment of the present invention.
Figure 2:
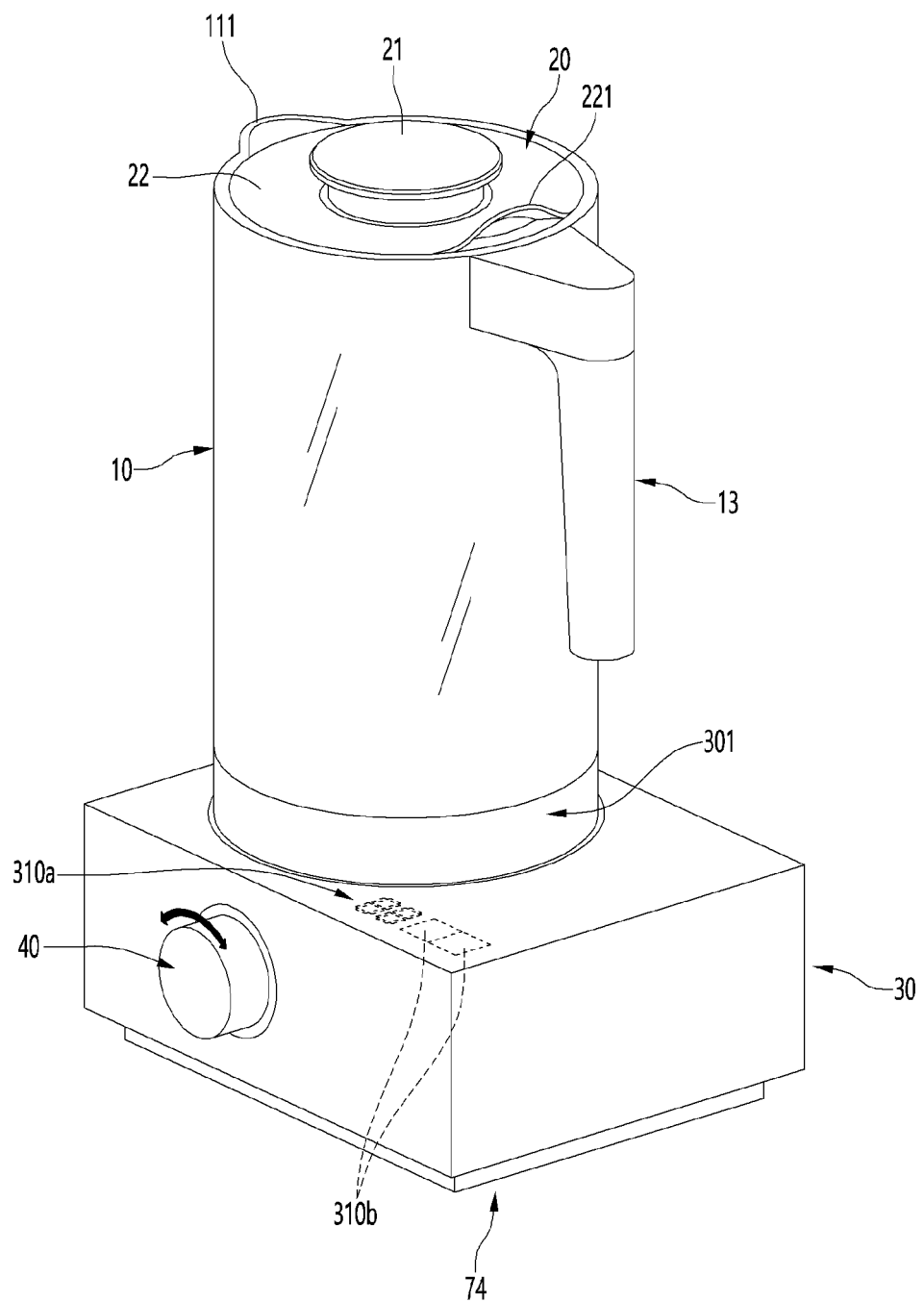
FIG. 2 is a perspective view of the blender.
Figure 3:
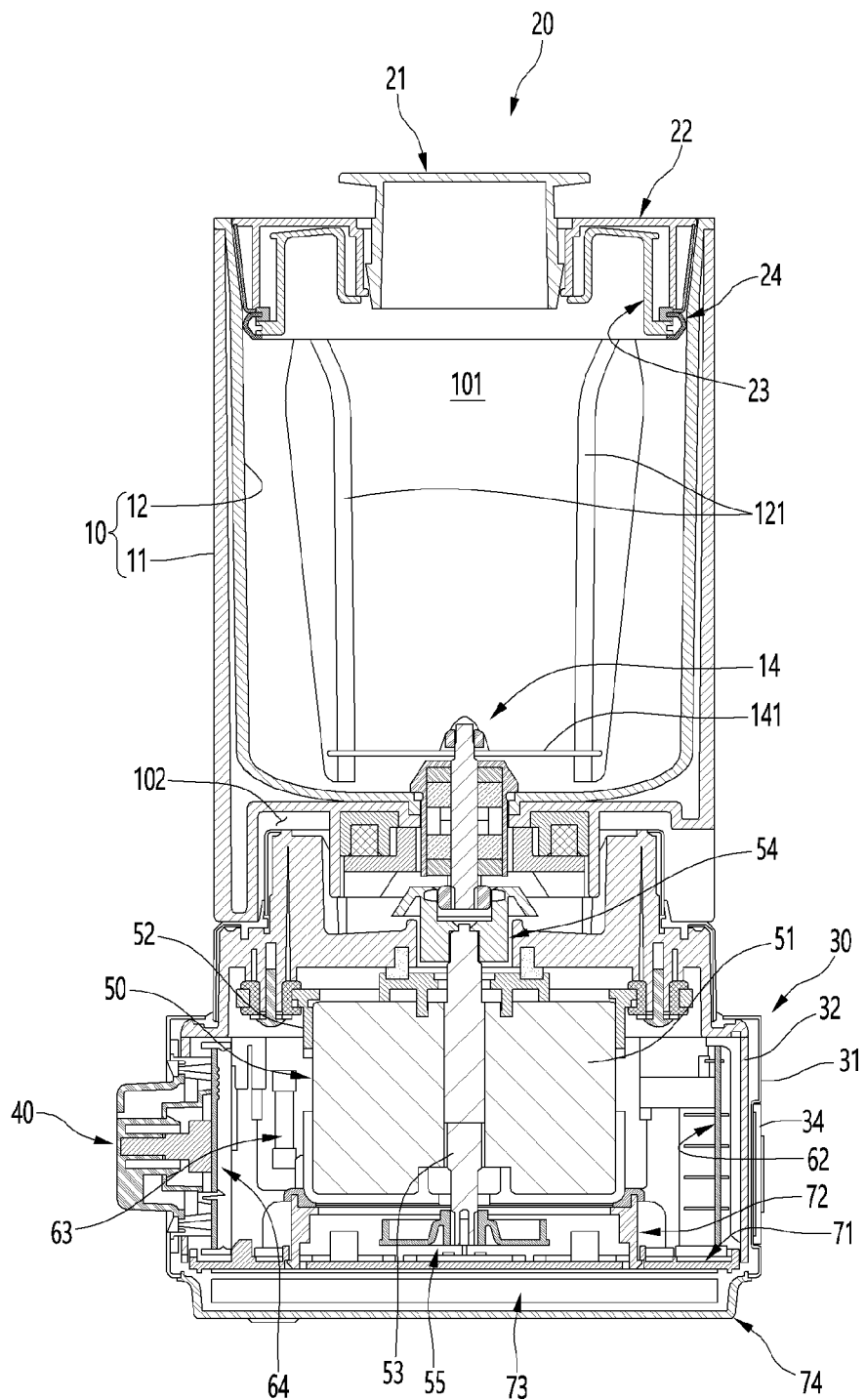
FIG. 3 is a longitudinal cross-sectional view of the blender.

FIG. 1 is a front view of a blender according to an embodiment of the present invention. FIG. 2 is a perspective view of the blender. FIG. 3 is a longitudinal cross-sectional view of the blender.

For the convenience of explanation and understanding, directions are defined first. A position at which a knob 40 is disposed is referred to as a front surface or a front side, and a portion to which a power connector (reference numeral 35 in FIG. 6) is connected is defined as a rear surface or a rear side. In addition, a position of the bottom of the body 30 may be referred to as a bottom surface or a lower side, and a position of an upper end of a container 10 may be referred to as a top surface or an upper side. In addition, a left side with respect to the knob 40 may be referred to as a left surface or a left direction, and a right side with respect to the knob 40 may be defined as a right surface or a right direction.

As illustrated in the drawings, a blender 1 according to an embodiment of the present invention may include a body 30 disposed on a bottom surface, and a container 10 (also referred to as a container) seated on an upper portion of the body 30.

In the body 30, electrical devices and components including a motor assembly 50 and a printed circuit board (PCB) module 60 for an operation of the blender 1 may be disposed. In addition, manipulation portions 40 and 310*b* for manipulating the operation of the blender 1 and a display portion 310*a* for displaying the operation may be provided.

The body 30 may have a hexahedral shape as a whole, and a container seating portion 301 for seating the container 10 thereon may be provided on a top surface of the body 30. The container seating portion 301 may be configured so that the container 10 is detachable in a vertical direction.

An outer appearance of the body 30 may be defined by an outer case 31 made of a metal material or having a metal texture, and the outer case 31 may have a hexahedral shape with an opened bottom surface. In addition, an inner case 32 may be provided inside the outer case 31, and a space in which the motor assembly 50 and the PCB module 60 are mounted may be provided inside the inner case 32.

The knob 40 for setting the operation of the blender 1 by a user may be provided on the front surface of the body 30. The knob 40 may protrude from the front surface of the body 30 and may be manipulated to set the operation of the blender 1 by rotation thereof.

A bottom cover 74 may be provided on the bottom surface of the body 30. The bottom cover 74 may be coupled to the outer case 31 and the inner case 32 and may be disposed to be in contact with the bottom surface on which the blender 1 is installed. In addition, the bottom cover 74 may allow the outer case 31 and the inner case 32 to be spaced apart from the bottom surface, and a cover suction hole 744 and a cover discharge hole 746, through which cooling air is suctioned into and discharged from the body 30, may be defined in the bottom cover 74.

A display portion 310*a* for visualizing an operation state of the blender 1 may be provided on the top surface of the body 30. For example, the display portion 310*a* may be provided in the form of at least one seven-segment display. The display portion 310*a* may be configured to express letters or numbers by being formed of a combination of fine through holes passing through the outer case 31.

In addition, a touch manipulation portion 310*b* capable of manipulating start or stop of the operation of the blender 1 may be provided on the top surface of the body 30.

At least one of the knob 40 and the touch module 65 operated for inputting and setting the operation of the blender 1 may be referred to as a manipulation portion.

In addition, the container seating portion 301 may be provided on the top surface of the body 30. The container seating portion 301 may protrude from the top surface of the body 30, and a portion of the container seating portion 301 may be inserted into a bottom surface of the container 10 to stably support the container 10. When the container 10 is seated on the container seating portion 301, the motor assembly 50 and the blade module 14 inside the container may be coupled to each other to transmit rotational force to the blade module 14.

The container seating portion 301 may be disposed at one side that is slightly biased from a center of the body 30. A total horizontal length including a handle 13 of the container 10 and a horizontal length of the body 30 correspond to each other. Thus, a center of a food accommodation space of the container 10 may be disposed to be eccentric from a center of the body 30, and a center of the container seating portion 301 may also be disposed in the same extension line as the center of the container 10. In addition, the knob 40 may be disposed at a position corresponding to the center line of the container seating portion 301 and the container 10 and may be disposed at an eccentric side of the front surface of the body 30.

The container seating portion 301 may also be made of the same material as the outer case 31. The container seating portion 301 may be made of a metal material or a material having a metal texture to have a sense of unity with the outer appearance of the body as a whole.

The motor assembly 50 may be mounted inside the body 30 below the container seating portion 301. The motor assembly 50 may be provided for rotation of the blade module 14 inside the container 10 and may rotate at a high speed. In addition, the rotational speed of the motor assembly 50 may be adjusted according to the manipulation of the knob 40.

An upper end of the motor assembly 50 may be connected to the blade module 14 inside the container 10. In addition, a cooling fan 55 may be provided at a lower end of the motor assembly 50, and when the motor assembly 50 is driven, the cooling fan 55 may rotate at the same time with the blade module 14 to force a flow of cooling air inside the body 30.

A plurality of PCB modules 60 may be disposed on an inner wall surface of the inner case 32 defining an inner surface of the body 30. The PCB module 60 may be provided in plurality and may be disposed around the inner surface of the body 30, that is, on front and rear surfaces and both left and right surfaces, respectively.

In addition, an opened bottom surface of the inner case 32 may be shielded by a base plate 71. In addition, the base plate 71 may be provided with an air guide 72 for guiding the discharge of the cooling air suctioned by the cooling fan 55.

A predetermined space may be defined between the base plate 71 and the bottom cover 74, and a wireless power module 73 may be provided between the base plate 71 and the bottom cover 74. The wireless power module 73 may supply power to the motor assembly 50 in a wireless manner using induced electromotive force.

The container 10 may be provided in a cylindrical shape corresponding to an outer diameter of the container seating portion 301, and a top surface of the container 10 may be opened to access the food accommodation space 101 therein.

The container 10 may be made of a material such as glass, tritan, transparent plastic, etc., so that the state of the food therein can be checked during the operation of the blender 1. In addition, the container 10 may include an outer container 11 defining an outer shape, and an inner container 12 defining an inner space in which food is accommodated.

The inner container 10 and the outer container 11 may be coupled to each other to define the overall shape of the container 10, and the container 10 may have a double-wall structure. In addition, the outer container 11 may be provided in a cylindrical shape having the same outer diameter at an upper end and a lower end thereof so that the outer appearance of the container 10 is seen to be neat. In addition, an outer diameter of the outer container 11 may be provided to be the same as an outer diameter of the container seating portion 301, so that the body 30 and the container 10 have a sense of unity when the container 10 is mounted.

In addition, a body accommodation portion 102 may be defined in the bottom surface of the outer container 11. The body accommodation portion 102 defines a space that is recessed upward from the bottom surface of the outer container 11 and defines a space into which a second seating portion 325 to be described below is inserted. The body accommodation portion 102 and the second seating portion 325 may be coupled to each other so that the container 10 is maintained in a state of being mounted on the container seating portion 301.

The container 10 may be provided with a blade module 14 at a center of the inner bottom surface. The blade module 14 includes a plurality of blades 141 and may be connected to the motor assembly 50. Thus, when the motor assembly 50 is driven while the container 10 is seated on the body 30, the blades 141 may rotate to crush or cut the food inside the container 10.

In addition, a plurality of inner guides 121 for guiding the rotating food may be provided inside the container 10. Each of the inner guides 121 may extend upward by a predetermined length from a lower end of the inner surface of the container 10 and may extend to a bottom surface of a lid 20 when the lid 20 is mounted.

A spout 111 for pouring the crushed food may protrude from an upper end of the container 10, and a handle 13 may protrude from one side facing the spout 111. The handle 13 may protrude outward from the upper end of the container 10 and extend downward so that the user may lift or move the container 10. The protruding end of the handle 13 may be disposed in the same extension line as a side end of the body 30.

In addition, the lid 20 may be mounted on the opened top surface of the container 10. The lid 20 may shield the opened top surface of the container 10, and the user may hold the lid handle 13 and separate the lid 20 from the container 10 to open or close the opened top surface of the container 10. The lid 20 may include a lid upper portion 22, a lid lower portion 23, and the lid handle 221, and a lid gasket 24 may be provided along a circumference of the lid 20.

Figure 4:
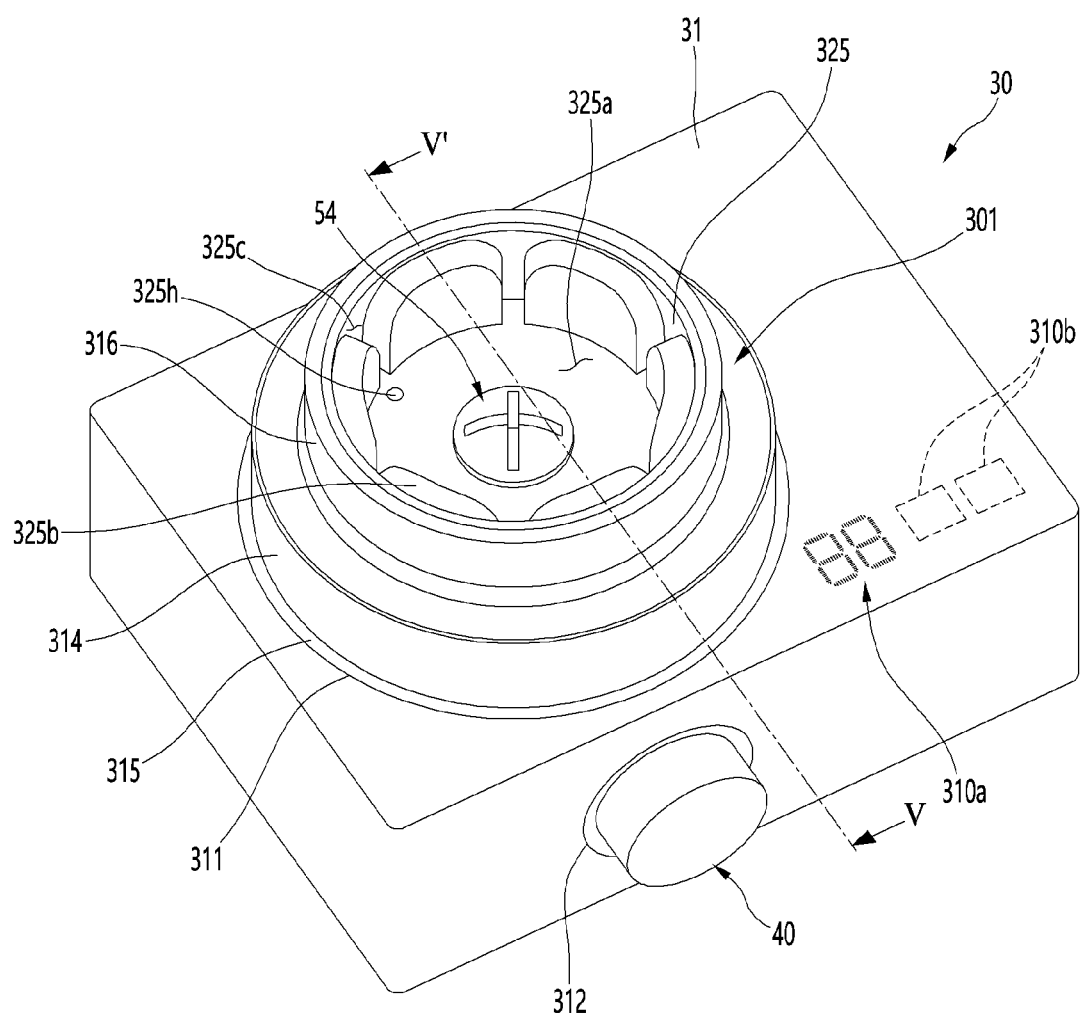
FIG. 4 is a perspective view of a body that is one component of the blender.
Figure 5:
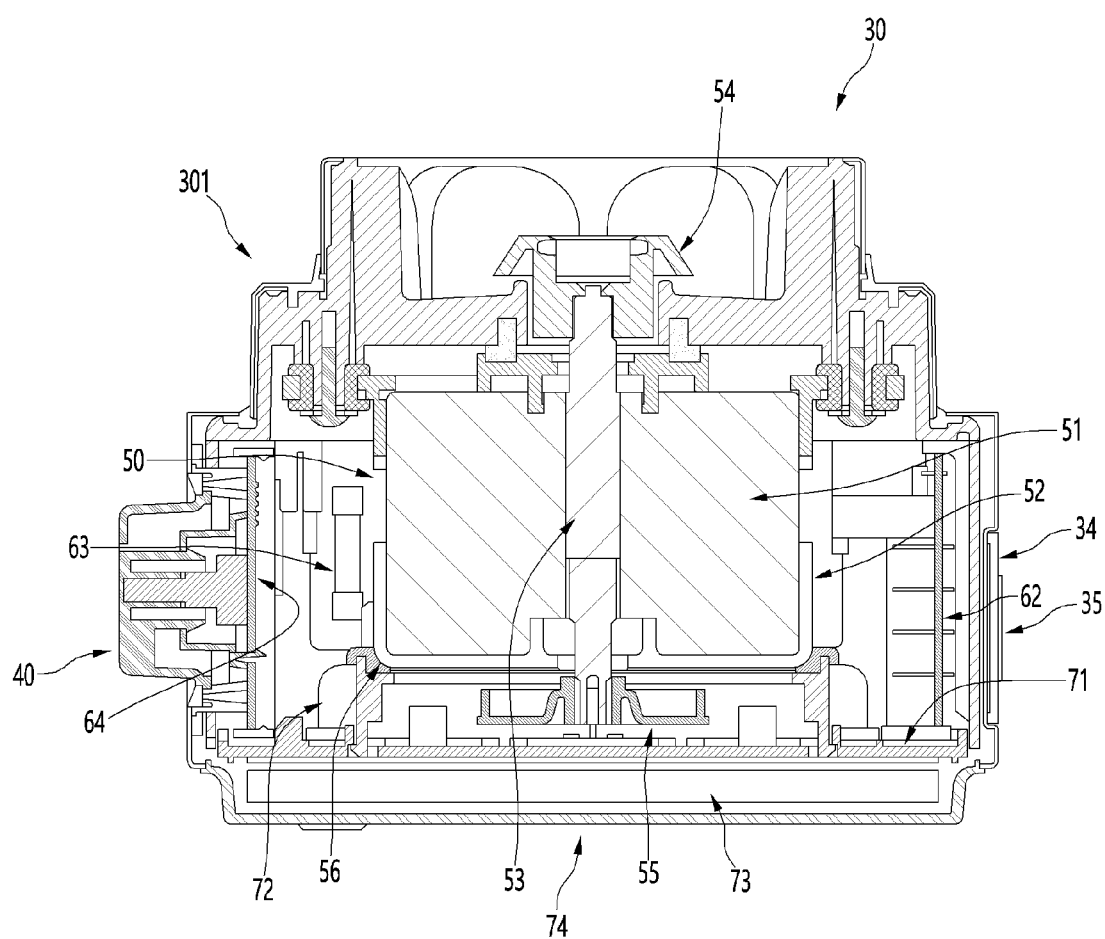
FIG. 5 is a cross-sectional view taken along line V-V' of FIG. 4.
Figure 6:
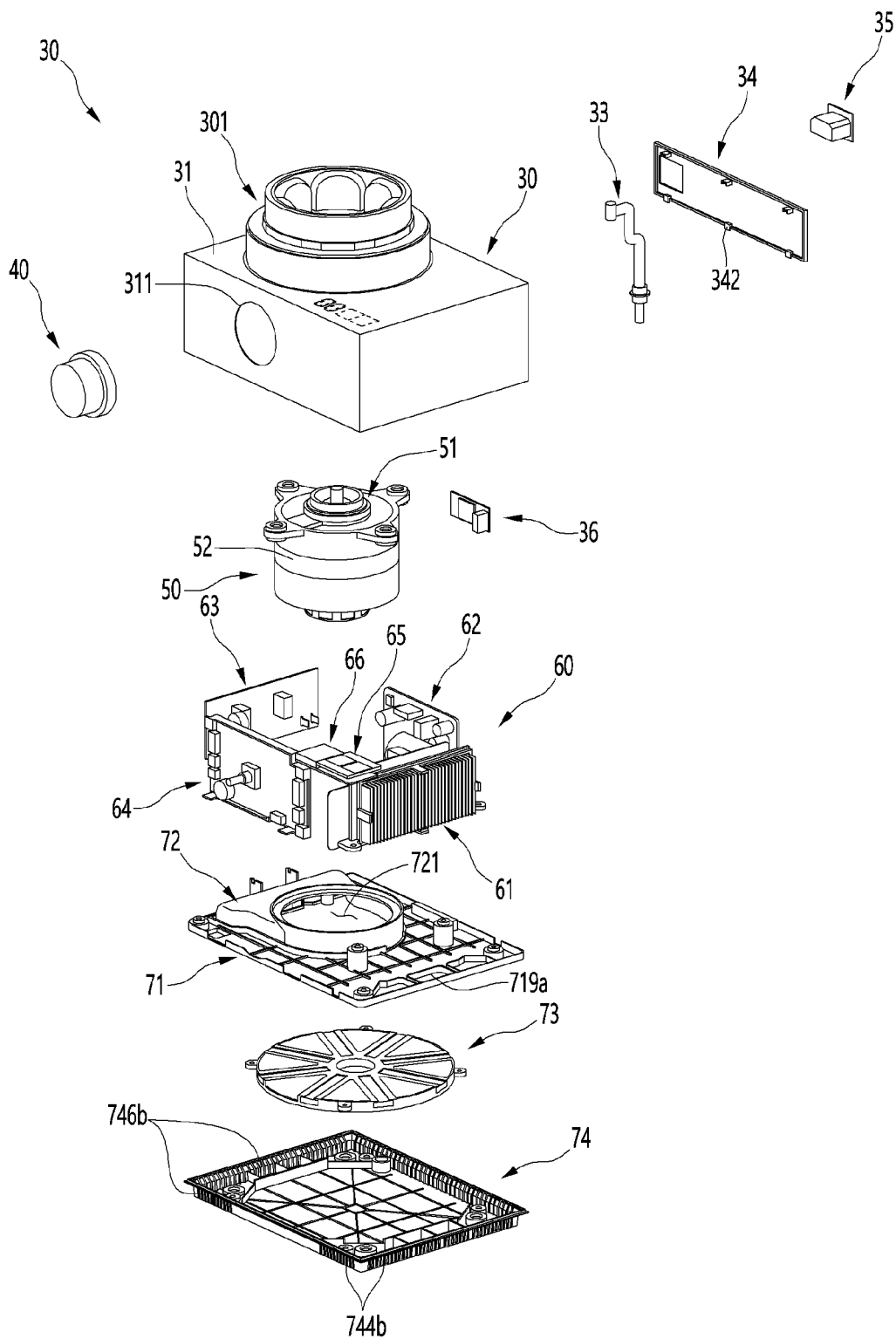
FIG. 6 is an exploded perspective view of the body when viewed from above.
Figure 7:
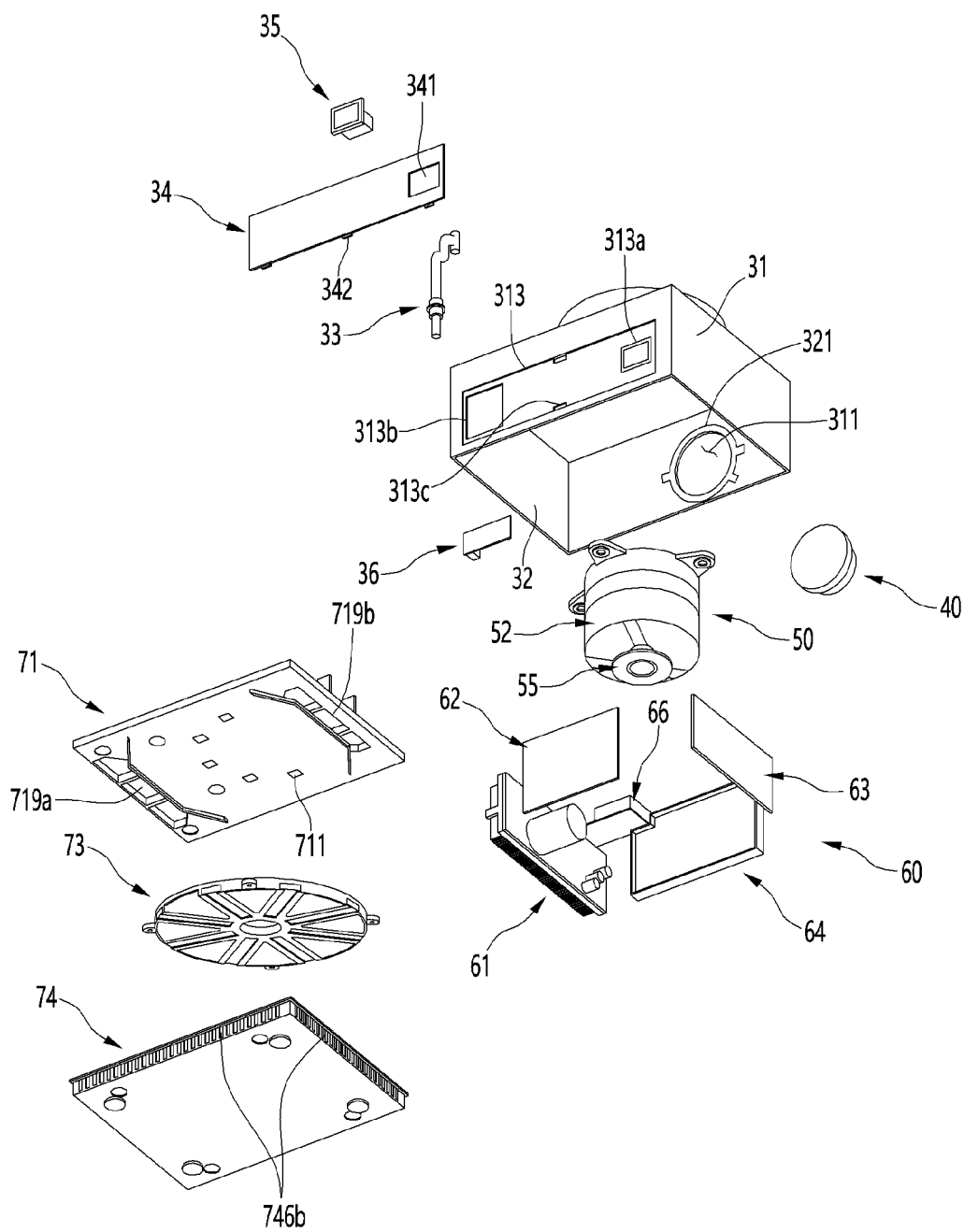
FIG. 7 is an exploded perspective view of the body when viewed from below.
Figure 8:
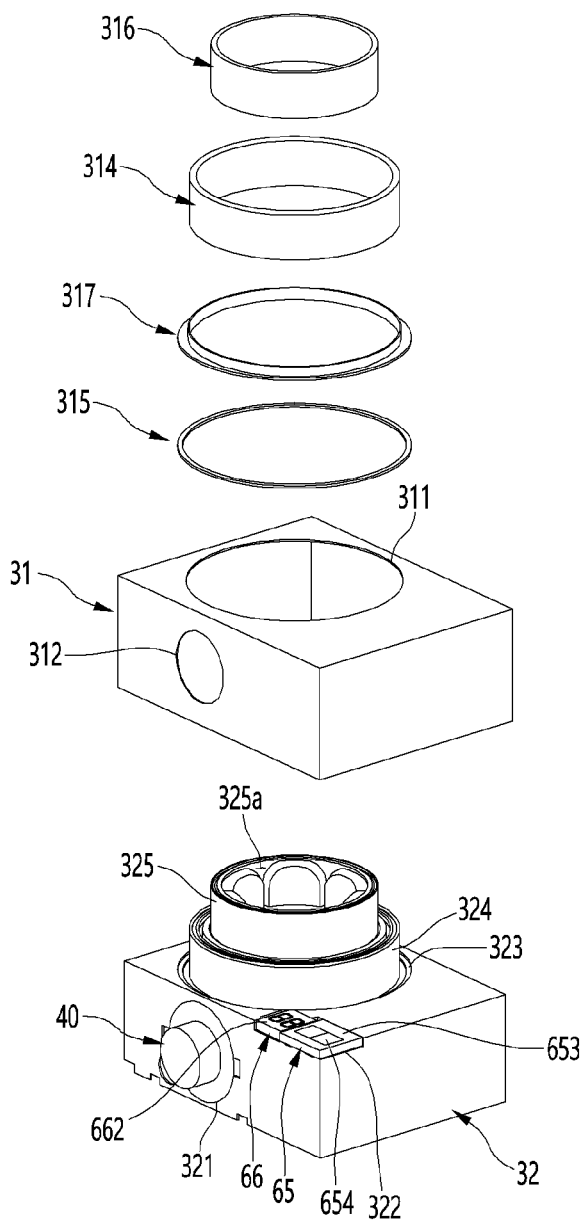
FIG. 8 is an exploded perspective view of constituents defining an outer appearance of the body.

FIG. 4 is a perspective view of a body that is one component of the blender. FIG. 5 is a cross-sectional view taken along line V-V' of FIG. 4. FIG. 6 is an exploded perspective view of the body when viewed from above. FIG. 7 is an exploded perspective view of the body when viewed from below. FIG. 8 is an exploded perspective view of constituents defining an outer appearance of the body.

As illustrated in the drawings, the body 30 may be provided in a rectangular parallelepiped box shape and may have a structure in which the container seating portion 301 for seating the container 10 protrudes from the top surface of the body 30, and the knob 40 for manipulating the operation of the blender 1 is disposed on the front surface of the body 30.

Also, the inner and overall structure of the body 30 may be defined by the inner case 32, and the outer case 31 may be mounted on the outside of the inner case 32 to define the outer appearance of the body 30. For this, the inner case 32 may be an injected plastic material that provides a structure in which the internal and external components of the body 30 are mounted.

In addition, the outer case 31 may be made of a metal material such as stainless steel, and a plate-shaped material may be bent and bonded to provide a very clean and solid appearance. Thus, the outer case 31 may form the outside of the body 30 in a hexahedral shape with an open lower surface, and the inner case 32 provides a structure in which a plurality of components may be mounted inside the outer case 31.

Each of the outer case 31 and the inner case 32 may have an open bottom surface, and the motor assembly 50 and the plurality of PCB modules 60 may be disposed inside the outer case 31 and the inner case 32. In addition, the opened bottom surface of the inner case 32 may be shielded by the base plate 71, and the bottom surface of the body 30 may be defined by the bottom cover 74.

Referring to the structure of the body 30 in more detail, the outer case 31 may include a rectangular top surface, and front and rear surfaces and left and right surfaces, which extend downward along a circumference of the top surface.

A top surface opening 311 may be defined in a top surface of the outer case 31. The top surface opening 311 may have a diameter equal to or slightly greater than an outer diameter of the container seating portion 301. Thus, when the inner case 32 and the outer case 31 are coupled to each other, the upper portion of the inner case 32 defining the container seating portion 301 may pass through the top surface opening 311 and then be exposed to the outer case 31.

A first seating portion decor 314, a second seating portion decor 316, a lower decor 315, and a connection decor 317 may be mounted on an upper portion of the inner case 32 protruding to the outside of the outer case 31. An overall outer appearance of the container seating portion 301 may be defined by the first seating portion decor 314, the second seating portion decor 316, the lower decor 315, and the connection decor 317. The first seating portion decor 314 and the second seating portion decor 316 may be made of the same material as the outer case 31 or a material having the same texture as the outer case 31.

Each of the first seating portion decor 314 and the second seating portion decor 316 may be provided in a ring shape having a predetermined height. The first seating portion decor 314 may have a diameter greater than that of the second seating portion decor 316, and the connection decor 317 may be provided in a ring shape that connects an upper end of the first seating portion decor 314 to the second seating portion decor 316.

In addition, the first seating portion decor 314, the second seating portion decor 316, and the connection decor 317 may be mounted on outer surfaces of a first seating portion 324 and a second seating portion 325, which are disposed on the inner case 32, and a top surface of the first seating portion 324, respectively.

The second seating portion 325 may extend upward from the top surface of the first seating portion 324, and an insertion space 325a in which a container coupling portion (not shown) defined at a lower end of the container 10 is accommodated may be defined therein. A container coupling protrusion 325b and a container coupling groove 325c, which couple to the container coupling portion protruding from the bottom surface of the container 10 may be provided on an inner surface of the insertion space 325a. In addition, a plurality of the container coupling protrusions 325b and the container coupling grooves 325c may be continuously disposed along the inner surface of the second seating portion 325. Therefore, when the container 10 is mounted on the container seating portion 301, the container coupling portion may be fixedly mounted in place by the mating with the container coupling protrusion 325*b* and the container coupling groove 325*c*.

In addition, a knob hole 312 in which the knob 40 is disposed may be defined in the front surface of the outer case 31. The knob 40 may protrude forward from the body 30 through the knob hole 312.

The inner case 32 may be provided in a box shape with an opened bottom surface, and the container seating portion 301 may be disposed on the top surface of the inner case 32. The inner case 32 may be constituted by a top surface having a planar shape as a whole, front and rear surfaces, and left and right surfaces vertically extending downward along a circumference of the top surface. The inner case 32 may be made of a plastic material to be molded to a relatively complex shape and may provide a structure for mounting the motor assembly 50 and the PCB module 60 therein.

A knob mounting hole 321 may be defined in the front surface of the inner case 32. The knob mounting hole 321 may be opened so that the knob 40 is disposed while being mounted on the main PCB module 64 and may be defined behind the knob hole 311.

On the top surface of the inner case 32, a downwardly recessed mounting portion 322 is defined at an edge thereof. In addition, a touch module 65 may be mounted on the mounting portion 322. The touch module 65 may include a display module 66 outputting information through the display portion 310*a*, and a touch sensor detecting a user's touch when the touch manipulation portion 310*b* is manipulated.

The motor assembly 50 may be provided in the inner space of the inner case 32. The motor assembly 50 may be configured for the rotation of the blade module 14 and may be disposed below a central portion of the container seating portion 301.

The motor assembly 50 may include a motor 51 including a motor shaft 53 extending in a vertical direction, a motor housing 52 in which the motor 51 is accommodated, a motor-side connection portion 54 provided on an upper end of the motor shaft 53, and a cooling fan 55 provided on a lower end of the motor shaft 53.

A motor-side connection portion 54 may be provided at the upper end of the motor shaft 53 to couple to a blade module 14 when the container 10 is mounted. The motor-side connection portion 54 may be coupled to the blade module 14 to transmit the rotational force of the motor 51. The motor-side connection portion 54 may be exposed through the top surface of the inner case 32 and may be disposed in a center of the insertion space 325*a* inside the container seating portion 301.

The cooling fan 55 may be exposed to the outside of the motor housing 52 and be accommodated inside an air guide 72 to be described below. Thus, when the cooling fan 55 operates, the air passing through the motor housing 52 may be guided to the inside of the air guide 72.

Also, a flow of air may be generated inside the body 30 according to the driving of the cooling fan 55. Particularly, at least some of the PCB modules disposed outside the motor housing 52 may be disposed in an air flow path generated by the cooling fan 55 and thus be cooled together.

The PCB module 60 for the operation of the blender 1 may be provided inside the inner case 32. The PCB module 60 may be disposed on the inner surfaces of the inner case 32, respectively. The PCB module 60 may be provided in plurality, which are separated from each other according to their functions, and may be arranged in parallel with a wall surface of the inner case 32 at a position adjacent to the inner surface of the inner case 32.

That is, the PCB modules 60 may be disposed to surround the motor assembly 50 at the outside with respect to the motor assembly 50. Thus, when the motor assembly 50 rotates, the PCB modules 60 may be disposed in the flow path of air passing through the motor assembly 50, and thus, the PCB modules 60 may be air-cooled. In addition, more effective heat dissipation or cooling may be possible by concentrating the flow of the cooling air to a PCB having a high heat generation temperature among the PCB modules 60.

In detail, the PCB modules 60 may include a main PCB module 64, an inverter PCB module 61 controlling the motor 51, a power PCB module 62 controlling input power, and a filtering PCB module 63 removing noise. In addition, the PCB module 60 may further include a communication module 36 connected to an external device by wireless communication.

The main PCB module 64 may be configured to control the overall operation of the blender 1, and in particular, the knob 40 may be mounted to the main PCB module 64 to receive the manipulation of the knob 40. The main PCB module 64 may be mounted on the front surface of the inside of the inner case 32, which corresponds to a position at which the knob 40 is mounted. The main PCB module 64 may be connected to the display module 66 and the touch module 65. Thus, the main PCB module 64 may transmit operation information of the blender 1 to the display module 66 and may receive a manipulation signal of the touch module 65 when the touch module 65 is manipulated.

The power PCB module 62 may be configured to supply power input to the inside of the blender 1 and may be mounted on the rear surface of the inside of the inner case 32 in which the power connector 35 is disposed. The power PCB module 62 may be generally referred to as a switching mode power supply (SMPS). The power PCB module 62 may convert the power input from the power connector 35 into a stable power state to supply the converted power for driving the blender 1. In addition, the power PCB module 62 may receive power from the wireless power module 73 when the blender 1 is used in a wireless manner, and similarly, may convert the power into a stable power state to supply the converted power for driving the blender 1.

The inverter PCB module 61 may be configured to control a speed of the motor 51 and be configured to control a rotational speed of the motor 51 to be variable according to user's manipulation. The inverter PCB module 61 may generate heat having a high temperature during the operation due to its operational characteristics, and thus, intensive cooling may be required. For this, in the inverter PCB module 61, a heat dissipation member 612 may be disposed on the inner surface of the inner case 32 corresponding to the plate suction hole 719*a* to perform the intensive cooling.

The filtering PCB module 63 may be connected to the power PCB module 62 and be configured to remove noise on a power frequency output from the power PCB module 62. In addition, the filtering PCB module 63 may be provided at one side of the inner surface of the inner case 32 facing the inverter PCB 611.

As described above, the main PCB module 64 and the power PCB module 62, and the inverter PCB module 61 and the filtering PCB module 63 may be disposed at positions facing each other. That is, the PCB modules 60 may be disposed to surround the motor assembly 50 on four sides of front, rear, left, and right sides with the motor assembly 50 at a center.

A base plate 71 may be provided on a lower end of the inner case 32. The base plate 71 may cover the opened bottom surface of the inner case 32 and may support some of the inner components of the inner case 32.

The base plate 71 may be provided in a plate shape and may be provided in a shape corresponding to the opened bottom surface of the inner case 32. In addition, a circumference of the base plate 71 may be coupled to the lower end of the inner case 32, and a space between the circumference of the base plate 71 and the lower end of the inner case 32 may be sealed.

In addition, a plate suction hole 719*a* and a plate discharge hole 719*b* may be defined in both left and right sides of the base plate 71, respectively. The plate suction hole 719*a* is defined along one end of the base plate 71 and may provide a passage through which air for cooling is introduced into the inner case 32 when the motor assembly 50 is driven. The plate discharge hole 719*b* may be defined along the other end of the base plate 71 and provide a passage through which the cooling air inside the inner case 32 is discharged to the outside of the inner case 32.

An air guide 72 may be disposed on the top surface of the base plate 71. The air guide 72 may be provided below the motor assembly 50 to connect to the plate discharge hole 719*b* in the housing lower hole, thereby guiding the discharge of the air cooling the motor while passing through the motor assembly 50. That is, the air guide 72 may define an independent air flow space from the motor assembly 50 to the discharge hole.

The air guide 72 may support the lower end of the motor housing 52 and may accommodate the cooling fan 55 therein. Thus, when the cooling fan 55 rotates, the air passing through the motor housing 52 may flow along the air guide 72.

The guide hole 721 may be opened at an upper end of the air guide 72. When the bottom plate 71 is coupled to the inner case 32, the lower end of the motor assembly 50 may be seated on the circumference of the guide hole 721, and the cooling fan 55 may be inserted through the guide hole 721.

The wireless power module 73 may be provided on a bottom surface of the base plate 71. The wireless power module 73 may be configured to supply wireless power to the blender 1, may include a plurality of ferrite cores and coils, and may be configured to receive power using an induced electromotive force method. Thus, the wireless power module 73 may be configured to receive power supplied by the induced electromotive force when the blender 1 is to be used wirelessly.

A bottom cover 74 may be provided below the base plate 71. The bottom cover 74 may define the bottom surface of the body 30 and may cover the opened bottom surface of the outer case 31. In addition, when the wireless power module 73 is mounted on the base plate 71, the wireless power module 73 may be covered by the bottom cover 74.

The bottom cover 74 may be provided in a plate shape having a size corresponding to that of the opened bottom surface of the outer case 31, and a circumference of the bottom cover 74 may extend upward to the outer case 31 and then be coupled to the lower end of the outer case 31. In addition, a cover suction hole 744 and a cover discharge hole 746 may be defined in the bottom cover 74, and an inflow of external air and discharge of air radiated from the inside of the body 30 may be performed through the cover suction hole 744 and the cover discharge hole 746.

A power connector 35 to which a power cord (not shown) supplying power for the operation of the body 30 is connected may be provided on the rear surface of the body 30. One end of the power cord is inserted into the power connector 35 to supply power to the body 30, and when the body 30 is moved or the body 30 is not in use, the power cord may be separated and stored.

In addition, the communication module 36 may be provided on the same surface as the surface on which the power connector 35 is mounted. The communication module 36 is provided for communication with a device disposed at a remote location, and transmits data transmitted through wireless communication to the PCB module 60 to control the operation of the blender 1. That is, the input of a signal for the operation of the blender 1 or the transmission of information on the operation state of the blender 1 is enabled by the wireless communication of the communication module 36. For example, the communication module 36 may be configured to enable data exchange by a wireless communication method using Wi-Fi, Bluetooth, Zigbee, NFC, or the like.

The communication module 36 may be provided on an inner wall surface of the inner case 32. Thus, the communication module 36 is not exposed to the outside in a mounted state, and is disposed close to the wall surface of the body 30 so that wireless communication with a device outside the body 30 may be smoothly performed.

A case recessed portion 313 recessed to accommodate the rear plate 34 may be defined on the rear surface of the outer case 31. In addition, the power connector 35 for supplying power to the body 30 may be mounted on the case recess portion 313. The power connector 35 may be mounted to be exposed to the outside through the rear plate 34.

In addition, a connector through hole 313*a* may be defined in the case recessed portion 313 at a position corresponding to the power connector 35. In addition, a plate coupling hole 313*c* in which the plate coupling protrusion 342 of the rear plate 34 is mounted may be defined inside the case recessed portion 313. In addition, a plate opening 341 may be defined in the rear plate 34 at a position corresponding to the power connector 35. Thus, the power connector 35 may cover the plate opening 341 and may be mounted to pass through the rear plate 34, the outer case 31, and the inner case 32.

A communication module opening 313*b* may be defined at a position corresponding to the communication module 36 in the case recessed portion 313. That is, the communication module opening 313*b* may be defined at a position corresponding to the communication module 36 in the outer case 31. That is, the communication module 36 enables the communication without passing through the outer case 31. Thus, the communication module 36 may smoothly communicate wirelessly with the outside of the outer case 31 made of a metal material.

In addition, the rear plate 34 is mounted on the case recessed portion 313 to cover the communication module opening 313*b*. Thus, the communication module opening 313*b* is not exposed to the outside.

Hereinafter, the structure of the rear surface of the body 30 will be described in more detail with reference to the drawings.

Figure 9:
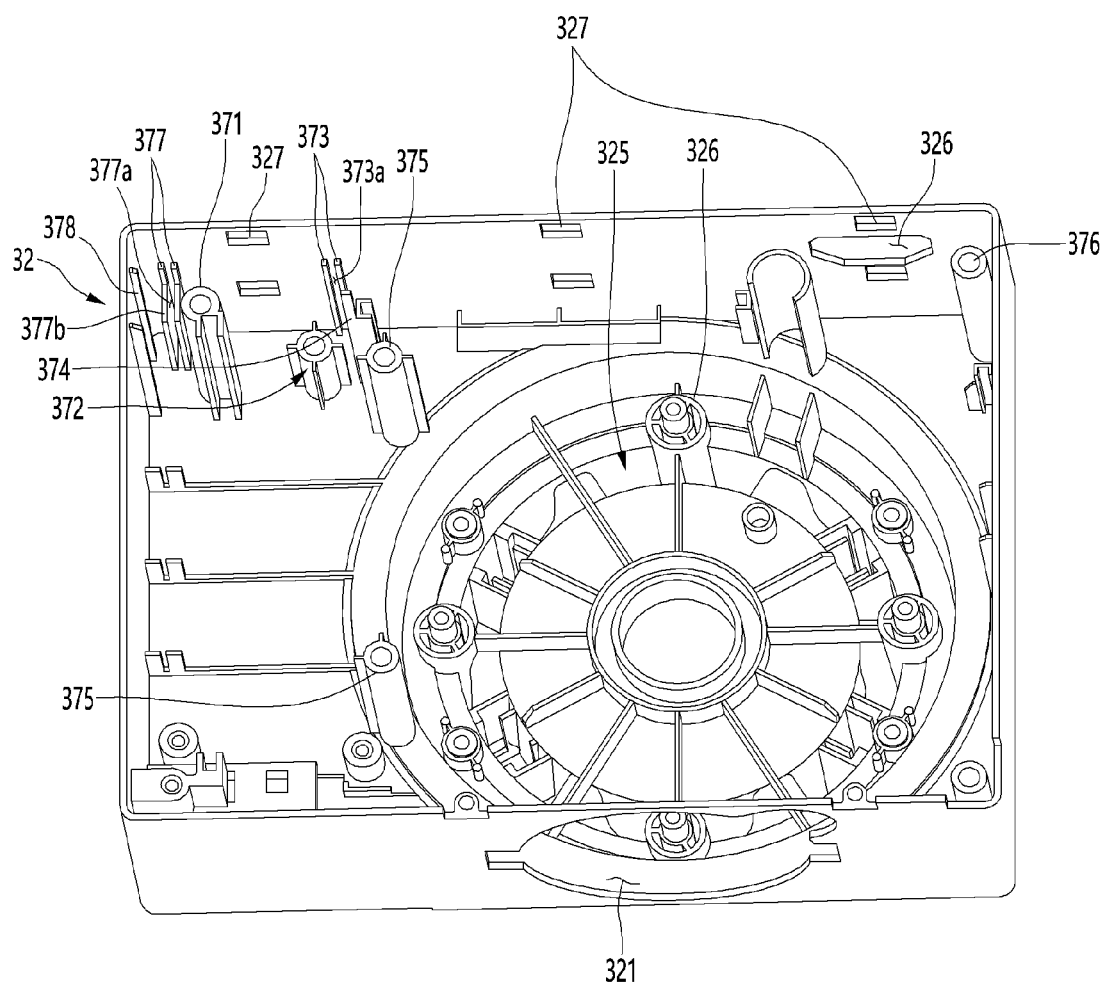
FIG. 9 is a perspective view of an inner case, which is one component of the body, when viewed from below.
Figure 10:
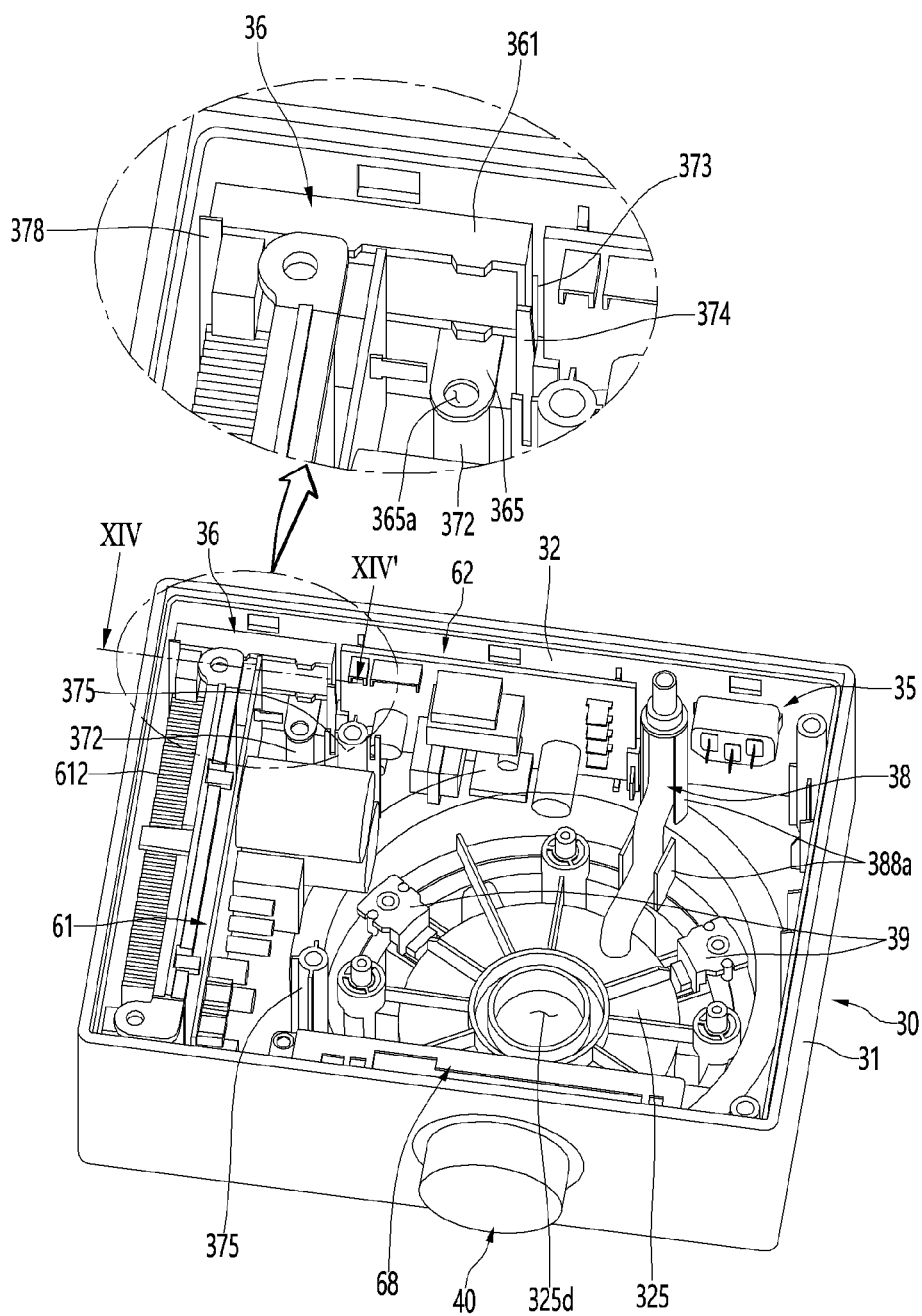
FIG. 10 is a perspective view of an internal structure of the body when viewed from below.
Figure 11:
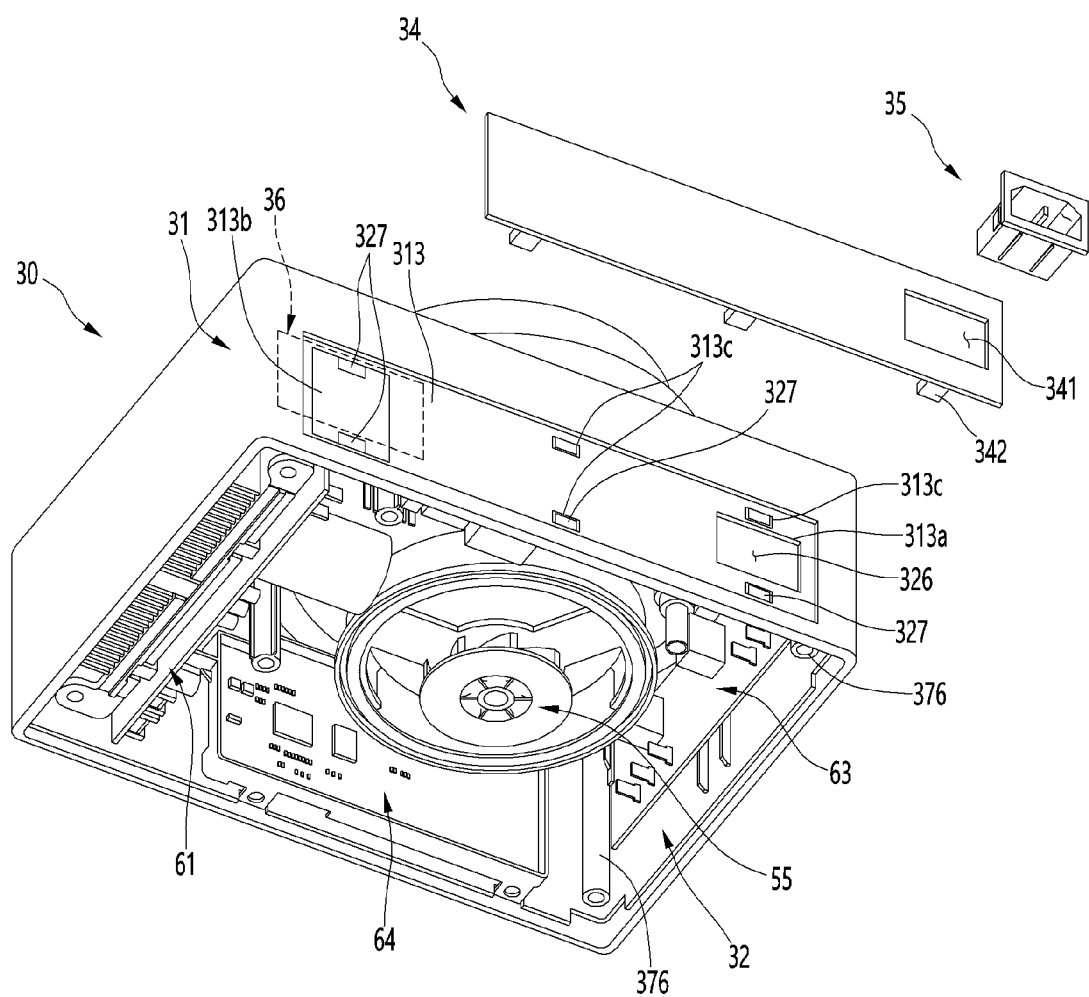
FIG. 11 is an exploded perspective view in which a rear plate is separated from the body.

FIG. 9 is a perspective view of an inner case, which is one component of the body, when viewed from below. FIG. 10 is a perspective view of an internal structure of the body when viewed from below. FIG. 11 is an exploded perspective view in which a rear plate is separated from the body.

As illustrated in the drawing, the inner case 32 may be formed in a hexahedral shape with an open lower surface. The inner case 32 may be inserted through the opened bottom surface of the outer case 31, and may be completely accommodated in the outer case 31.

In addition, the first seating portion 324 and the second seating portion 325 protruding upward may be formed with a step difference on the top surface of the inner case 32. In addition, a detection device accommodation portion in which a detection device for detecting the container 10 is mounted may be disposed at a position corresponding to the second seating portion 325. The detection device may be disposed at a position corresponding to the inner surface of the second seating portion 325, and a plurality of the detection devices may be disposed radially based on the center of the second seating portion 325.

In addition, a structure for coupling with the base plate 71 for covering the open lower surface of the inner case 32 may be provided inside the inner case 32. Looking at the coupling structure of the inner case 32 and the base plate 71, a plurality of bosses 371, 375, and 376 may be defined inside the inner case 32 for coupling with the base plate 71. The plurality of bosses 371, 375, and 376 may extend from the top surface of the inside of the inner case 32 toward the opened bottom surface of the inner case 32.

A connector mounting hole 326 and a plate restriction hole 327 may be defined on the rear surface of the inner case 32 corresponding to the case recessed portion 313.

The case recessed portion 313 may have a size and shape corresponding to the rear plate 34, and the case recessed portion 313 may be covered by the rear plate 34. In addition, the depth of the case recessed portion 313 may be formed to correspond to the thickness of the rear plate 34. When the rear plate 34 is mounted, the rear surface of the outer case 31 and the rear plate 34 may be positioned on the same plane.

The rear plate 34 may be made of a material different from that of the outer case 31. For example, the rear plate 34 may be made of a plastic material. Thus, even when the communication module 36 is provided inside the outer case 31 made of a metal material, it is possible to transmit a communication signal through the rear plate 34.

The plate coupling hole 313c may be defined on the rear surface of the inner case 32 corresponding to the case recessed portion 313. The plate coupling hole 313c may be defined at a position corresponding to the plate restriction hole 327. When the inner case 32 is accommodated in the outer case 31, the plate restriction hole 327 and the plate coupling hole 313c may be aligned with each other. In addition, when the rear plate 34 is mounted, the plate coupling protrusion 342 of the rear plate 34 may pass through the plate restriction hole 327 and may be coupled to the plate coupling hole 313c.

A plurality of the plate coupling protrusions 342 may be arranged at regular intervals along the circumference of the rear plate 34. In addition, the plate restriction hole 327 and the plate coupling hole 313c may be disposed at positions corresponding to the plate coupling protrusion 342. For example, the plate restriction hole 327 and the plate coupling hole 313c may be disposed along the inner circumference of the case recessed portion 313.

The plurality of plate restriction holes 327 are arranged at regular intervals on the case recessed portion 313, so that the rear plate 34 may be maintained in a state of being fixed and mounted to the outer case 31 as a whole. In this case, at least one of the plurality of plate restriction holes 327 may be located at a position corresponding to a position where the communication module 36 is mounted.

In addition, a connector mounting hole 326 in which the power connector 35 is mounted may be defined on the rear surface of the inner case 32 corresponding to the case recessed portion 313. In the state in which the rear plate 34 is mounted to the case recessed portion 313 of the outer case 31, the power connector 35 may be mounted to sequentially pass through the plate opening 341, the connector through hole 313a, and the connector mounting hole 326.

The communication module opening 313b may be defined inside the case recessed portion 313. In this case, the communication module opening 313b may be a position corresponding to the communication module 36 mounted inside the inner case 32. For example, the connector through hole 313a and the communication module opening 313b are respectively defined in the inner region of the case recessed portion 313, and may be respectively disposed on both left and right sides of the case recessed portion 313. In addition, the communication module opening 313b may be disposed at a position where at least a portion of the communication module 36 overlaps. Thus, the communication module 36 may be configured to communicate through the inner case 32 without passing through the outer case 31.

A plurality of components for the communication module 36 to be fixedly mounted may be provided on the rear surface among the inner circumferential surfaces of the inner case 32, that is, the inner side of one surface on which the power connector 35 and the rear plate 34 are disposed.

As illustrated in FIG. 9, module support ribs 373 and 377 may be formed inside the rear side of the inner case 32 on which the rear plate 34 is mounted. The module support ribs 373 and 377 may extend longitudinally in the vertical direction, and may extend to support at least a portion of the communication module 36.

In detail, the module support ribs 373 and 377 may be provided with a first support rib 373 and a second support rib 377 disposed on both left and right sides. The rear surface of the communication module 36 may be stably supported on both left and right sides by the first support rib 373 and the second support rib 377.

The first support rib 373 may be provided with a pair of ribs, and a first space 373a may be defined between the pair of first support ribs 373 spaced apart from each other. In addition, a first case rib 364a to be described below may be inserted into the first space 373a. A mounting position of the communication module 36 may be guided while the first support rib 373 and the first case rib 364a are coupled to each other.

The second support rib 377 may be provided with a pair of ribs, and a second space 377a may be defined between the pair of second support ribs 377 spaced apart from each other. In addition, a second case rib 364b to be described below may be inserted into the second space 377a. A mounting position of the communication module 36 may be guided while the second support rib 377 and the second case rib 364b are coupled to each other.

A rib support portion 377b may be defined on the second support rib 377. The rib support portion 377b may be formed to further protrude inward from a position in contact with the outer end of the communication module 36 in the second support rib 377. The end of the rib support portion 377b may be formed to be stepped, thus supporting the circumference of the communication module 36.

Side restriction ribs 378 may be defined on the other surface of the inner surface of the inner case 32 crossing the inner surface of the inner case 32 on which the second support rib 377 is formed. That is, the side restriction ribs 378 may be formed to protrude from one side of the inner case 32, which is closer to the second support rib 377, among the left and right side surfaces of the inner case 32.

The side restriction ribs 378 may protrude in a direction crossing the second support ribs 377. In addition, the end of the side restriction rib 378 may extend to restrict one end of the communication module 36.

A case restriction rib 374 may be defined on one side of the first support rib 373. The case restriction rib 374 may be defined at a position spaced forward apart from the first support rib 373 by a predetermined distance, and may extend vertically. The first supporting rib 373 and the case restriction rib 374 may be spaced apart from each other, and one end of the communication module 36 may be inserted and fixed in the space 374a therebetween. Thus, both ends of the communication module 36 may be restricted by the side restriction ribs 378 and the case restriction ribs 374.

In addition, a case fixing boss 372 may be provided on one side of the inner case 32. The case fixing boss 372 may be formed to protrude from the inner side of the top surface of the inner case 32. In addition, the case fixing boss 372 may be defined at a position corresponding to a screw coupling portion 365 to be described below, and a screw 327b for mounting the communication module 36 may be coupled thereto.

Hereinafter, the mounting structure of the communication module 36 will be described with reference to the drawings.

Figure 12:
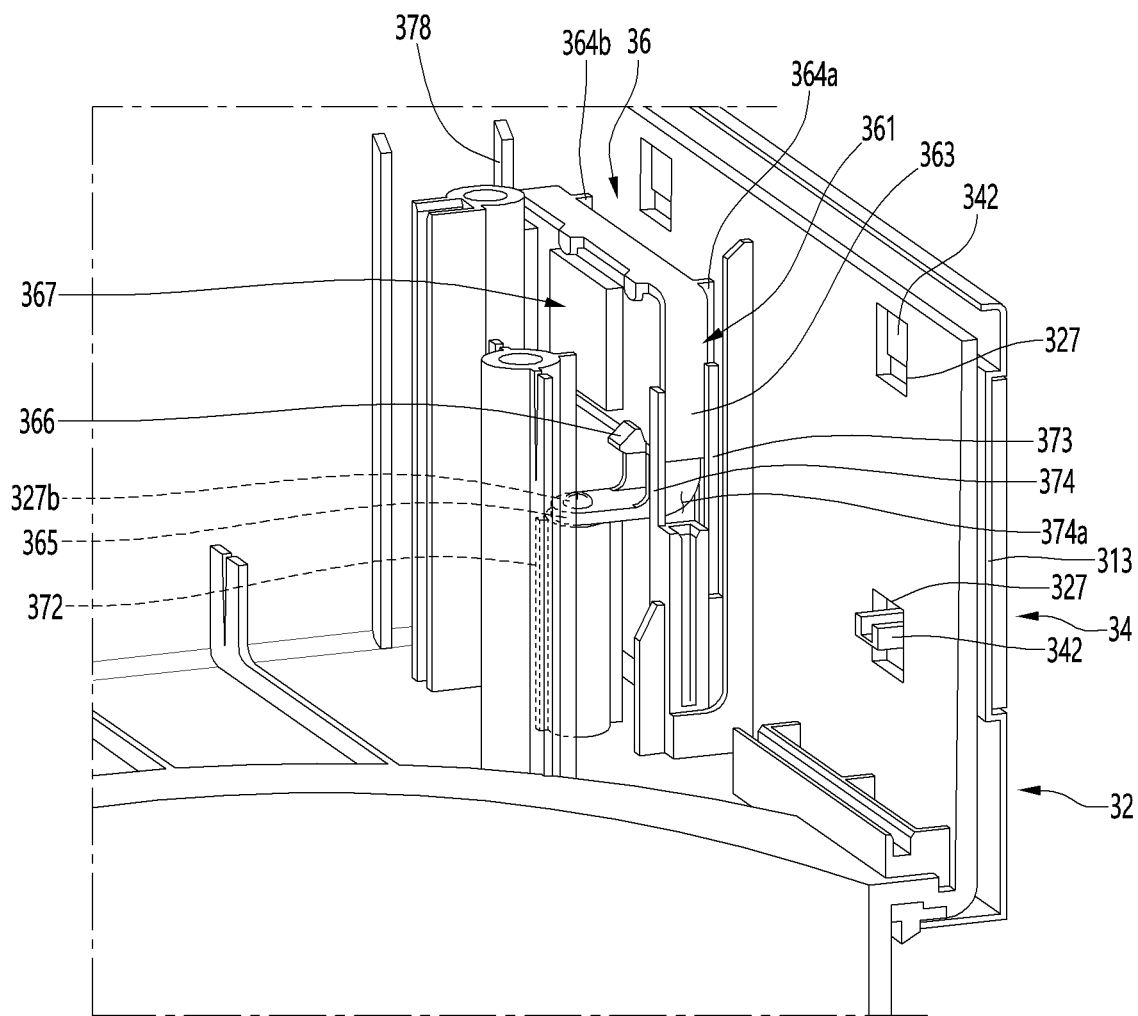
FIG. 12 is a partially cutaway perspective view of a state in which a communication module according to an embodiment of the present invention is mounted.
Figure 13:
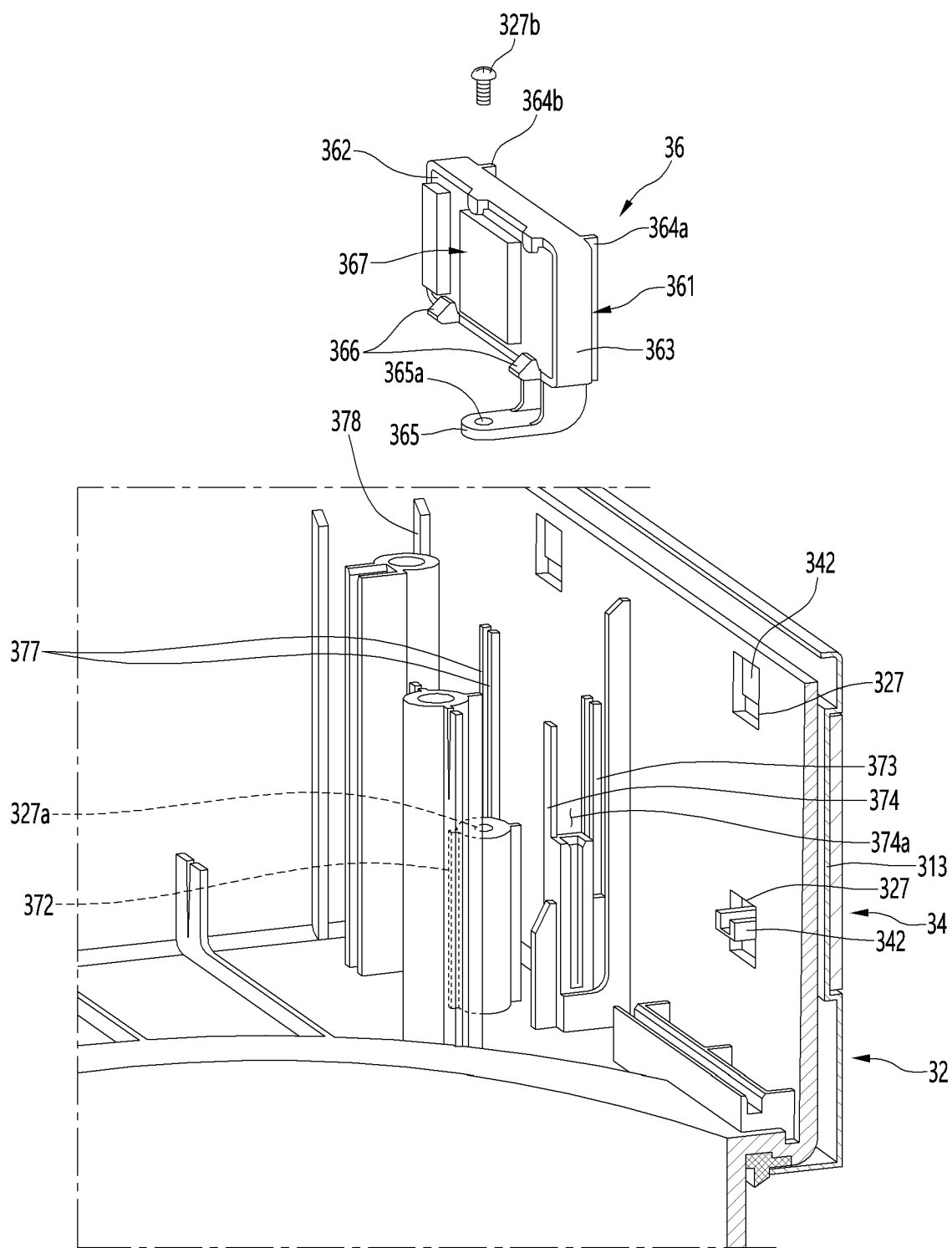
FIG. 13 is a partially cutaway perspective view of a state in which the communication module is separated.
Figure 14:
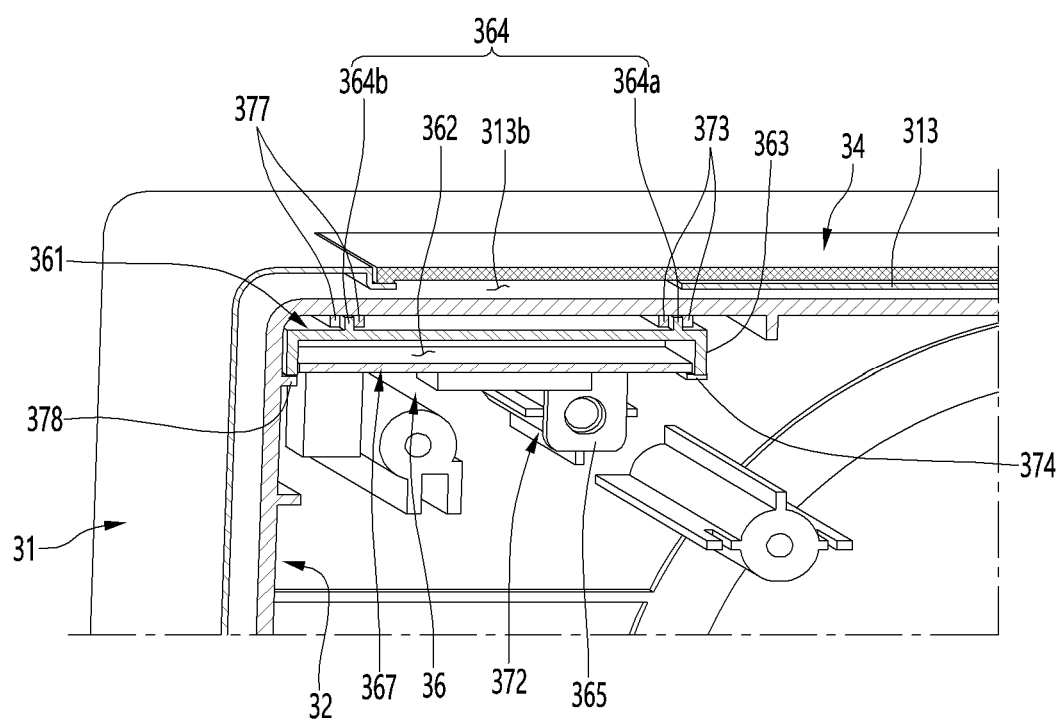
FIG. 14 is a cutaway perspective view taken along line XIV-XIV' of FIG. 10.

FIG. 12 is a partially cutaway perspective view of a state in which a communication module according to an embodiment of the present invention is mounted. FIG. 13 is a partially cutaway perspective view of a state in which the communication module is separated. FIG. 14 is a cutaway perspective view taken along line XIV-XIV' of FIG. 10.

As illustrated in the drawings, in order to mount the communication module 36 to the inner case 32, the communication module 36 is first assembled.

The communication module 36 may include a communication PCB 367 mounted with a plurality of elements for transmitting and receiving signals and processing signals for wireless communication, and a PCB case 361 to which the communication PCB 367 is fixed and mounted.

The communication PCB 367 is formed in a rectangular plate shape, and may be fixed and mounted inside the PCB case 361. The PCB case 361 is formed to open forward, and has a shape corresponding to the communication PCB 367 so as to accommodate the communication PCB 367.

The edge of the PCB case 361 may be in contact with the circumferential surface of the communication PCB 367 and form a space opened forward. In addition, a PCB restriction protrusion 366 may be defined at the edge end of the PCB case 361. The PCB restriction protrusion 366 may protrude inward from the opened front end of the PCB case 361. As an example, the PCB restriction protrusion 366 may be defined at the opened upper end and the lower end of the PCB case 361, respectively. A plurality of materials may be spaced apart from each other to restrict the upper and lower ends of the communication PCB 367.

In addition, a case rib 364 protruding rearward may be defined on the rear surface of the PCB case 361. The case rib 364 may be elongated in the vertical direction, and may extend from the upper end to the lower end of the rear surface of the PCB case 361.

A plurality of case ribs 364 may be spaced apart from each other, and may include a first case rib 364a and a second case rib 364b defined at positions corresponding to the first space 373a and the second space 377a. Thus, in order to mount the communication module 36, the case rib 364 may be inserted from the lower end of the first space 373a and the second space 377a defined by the first support rib 373 and the second support rib 377, and may be press-fitted to the upper ends of the first space 373a and the second space 377a. The communication module 36 is not inclined by the pair of the first supporting rib 373 and the second supporting rib 377, and it is possible to guide the mounting of the communication module 36 to an accurate position.

In the process in which the communication module 36 is fully inserted, both of the left and right ends of one end of the PCB case 361 may be inserted and restricted into a space between the first support rib 373 and the case restraining rib 374. In addition, both of the left and right ends of the other end of the PCB case 361 may be restricted by the side restriction ribs 378.

Both the case restriction rib 374 and the side restriction rib 378 extend in the vertical direction. Thus, the movement of the communication module inserted from the lower opening of the inner case 32 is guided and fixedly mounted at an accurate position.

A rib support portion 377b protrudes from the second support rib 377, and the rib support portion 377b supports the circumference of the PCB case 361. That is, the rib support portion 377b allows the communication module 36 to be mounted and maintained at an accurate position without being able to further move any more when the communication module 36 is inserted and mounted. Thus, in a state in which the communication module 36 is in contact with the rib support portion 377b, the communication module 36 may be disposed at a position where at least a portion thereof overlaps with the communication module opening 313b.

In addition, the PCB case 361 may be spaced apart from the inner surface of the inner case 32 by a predetermined distance due to the protruding structure of the first support rib 373 and the second support rib 377. Thus, the plate coupling protrusion 342 may be formed so as not to interfere with the communication module 36 even when the plate coupling protrusion 342 is inserted through the plate coupling hole 327. That is, the module support ribs 373 and 377 guide the mounting of the communication module to the correct position, and the communication module 36 is slightly spaced apart from the inner wall surface of the inner case 32 to prevent interference with the coupling structure of the rear plate 34.

A screw coupling portion 365 extending forward may be defined at the upper end of the PCB case 361. A hole 365a through which a screw 327b for fixing the communication module 36 passes may be defined at the end of the screw coupling portion 365. The screw coupling portion 365 may extend from the end of the PCB case 361 and may extend to the case fixing boss 372.

In addition, when the communication module 36 is inserted from the bottom to the top, the screw coupling portion 365 may be seated on the lower surface of the case fixing boss 372. In this case, the hole 365a of the screw coupling portion 365 and the coupling hole 327a of the top surface of the case fixing boss 372 may be aligned with each other so that the screw 327b may be coupled.

The height of the upper end of the case fixing boss 372 may correspond to the height of the rib support portion 377b. Thus, when the communication module 36 is mounted, one end of the edge of the PCB case 361 is seated on the rib support portion 377b and the case fixing boss 372, so that the mounting position may be maintained.

Thus, the communication module 36 may be mounted while being inserted from the bottom to the top inside the inner case 32. When the communication module 36 is moved to a designated position by the components guiding the communication module 36 to be mounted to an accurate position, the end of the PCB case 361 is seated on the rib support portion 377b, and the screw coupling portion 365 may be seated on the top surface of the case fixing boss 372. In this state, the assembly of the communication module 36 may be completed by the screw 327b that passes through the screw coupling portion 365 and is coupled to the top surface of the case fixing boss 372.

Information for the operation of the blender 1 may be transmitted through the communication module 36 in a state in which the mounting of the communication module 36 is completed and all other components constituting the body 30 are mounted.

INDUSTRIAL APPLICABILITY

Since the blender according to an embodiment of the present invention can improve communication performance, industrial applicability is high.

The invention claimed is:

1. A blender comprising:
a body including an outer case made of a metal material to define an outer appearance and an inner case accommodated inside the outer case;
a container which is seatable on the body in which a blade module for crushing food is disposed;
a motor assembly inside the inner case to rotate the blade module; and
a wireless communication module in the inner case to perform wireless communication with a remote device,
wherein the outer case includes a communication module opening that is opened at a position corresponding to a mounting position of the wireless communication module in the inner case, and
wherein at least a portion of a circumferential surface of the inner case is spaced apart from at least a portion of a circumferential surface of the outer case,
a case recessed portion is defined on a portion of an outer surface of the outer case so as to be in contact with a portion of an outer surface of the inner case, and
the wireless communication module opening is defined inside the case recessed portion.

2. The blender of claim 1, wherein the outer case and the inner case are formed in a box shape with an open lower surface, respectively, and the open lower surfaces are covered by a bottom cover defining a bottom surface of the blender.

3. The blender of claim 2, wherein a lower end of the outer case is bent inward,
and the inner case is accommodated through the open lower surface of the outer case, and
at least a portion of a circumferential surface of the inner case is spaced apart from at least a portion of a circumferential surface of the outer case.

4. The blender of claim 2, wherein the wireless communication module is accommodated through the open lower surface of the inner case, and
the wireless communication module is mounted on an inner surface of the inner case.

5. The blender of claim 1, comprising a rear plate mounted on the case recessed portion to cover the case recessed portion, and
the rear plate is made of a material different from that of the outer case.

6. The blender of claim 1, comprising a rear plate mounted on the case recessed portion and having a thickness corresponding to a depth of the case recessed portion, and
an outer surfaces of the rear plate and an outer surface of the outer case form a same plane.

7. The blender of claim 1, comprising a rear plate is mounted on the case recessed portion,
the rear plate including a plate coupling protrusion, and
the case recessed portion including a plate coupling hole into which the plate coupling protrusion is inserted.

8. The blender of claim 7, wherein the inner case comprises a plate restriction hole defined at a position corresponding to the plate coupling hole, and
the plate coupling protrusion sequentially passes through the plate coupling hole and the plate restriction hole and is restricted at the inner case.

9. The blender of claim 1, wherein the communication module opening has a size that overlaps at least a portion of the wireless communication module.

10. The blender of claim 1, wherein the wireless communication module comprises:
a communication printed circuit board (PCB); and
a PCB case in which the communication PCB is accommodated and which is fixed and mounted to the inner case.

11. The blender of claim 10, wherein an inner surface of the inner case is provided with a module support rib to support the PCB case.

12. The blender of claim 11, wherein the module support rib comprises
a pair of module support ribs extending in a vertical direction while being spaced apart from each other, and
the PCB case comprises a case rib that is inserted into a space between the pair of the module support ribs.

13. The blender of claim 11, wherein the inner case includes a case restriction rib protruding to be spaced apart from the module support rib, and
the PCB case is inserted and fixed between the module support rib and the case restriction rib.

14. The blender of claim 13, wherein the PCB case includes a screw coupling portion which protrudes in a direction crossing an inserting direction of the communication module and through which a screw passes, and
a case fixing boss which protrudes to be supported by the screw coupling portion and to which the screw couples is defined in the inner case.

* * * * *